(12) United States Patent
Cho et al.

(10) Patent No.: US 7,876,734 B2
(45) Date of Patent: Jan. 25, 2011

(54) SYSTEM AND METHOD FOR TRANSMITTING/RECEIVING SIGNAL IN A COMMUNICATION SYSTEM

(75) Inventors: Jae-Hee Cho, Seoul (KR); Chung-Ryul Chang, Yongin-si (KR); Jae-Weon Cho, Suwon-si (KR); Soon-Young Yoon, Seoul (KR); In-Seok Hwang, Seoul (KR); Kwan-Hee Roh, Hwaseong-si (KR); Yong-Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 12/253,186

(22) Filed: Oct. 16, 2008

(65) Prior Publication Data

US 2009/0103569 A1 Apr. 23, 2009

(30) Foreign Application Priority Data

Oct. 17, 2007 (KR) ............... 10-2007-0104770
Oct. 19, 2007 (KR) ............... 10-2007-0105833
Nov. 28, 2007 (KR) ............... 10-2007-0122340

(51) Int. Cl.
*H04J 3/00* (2006.01)
(52) U.S. Cl. ............... 370/337; 370/376; 370/477

(58) Field of Classification Search ............... 370/337, 370/376, 477, 342, 445, 345, 441, 442, 479, 370/458
See application file for complete search history.

(56) References Cited

U.S. PATENT DOCUMENTS

| 5,966,373 | A | 10/1999 | Stephenson et al. |
| 6,272,128 | B1 | 8/2001 | Pierson |
| 6,993,009 | B2 * | 1/2006 | Kelly et al. ............... 370/350 |
| 7,006,464 | B1 * | 2/2006 | Gopalakrishnan et al. ... 370/328 |
| 7,342,940 | B2 * | 3/2008 | Park ............... 370/470 |
| 7,359,359 | B2 * | 4/2008 | Parkvall et al. ............... 370/337 |
| 7,463,600 | B2 * | 12/2008 | Tong et al. ............... 370/314 |

\* cited by examiner

*Primary Examiner*—Huy D Vu
*Assistant Examiner*—Dady Chery
(74) *Attorney, Agent, or Firm*—Jefferson IP Law, LLP

(57) ABSTRACT

A system and method for transmitting/receiving a signal in a communication system are provided, in which a transmitter determines to change a transmission time of a superframe header, when a structure of a superframe is changed, determines the transmission time of the superframe header according to a result of the determination to change the transmission time of the superframe header, transmits information about the determined transmission time to a receiver, and transmits the superframe header at the determined transmission time.

32 Claims, 17 Drawing Sheets

SYSTEM AND METHOD FOR TRANSMITTING/RECEIVING SIGNAL IN A COMMUNICATION SYSTEM

PRIORITY

This application claims the benefit under 35 U.S.C. §119 (a) of a Korean patent application filed in the Korean Intellectual Property Office on Oct. 17, 2007 and assigned Serial No. 2007-104770, a Korean patent application filed in the Korean Intellectual Property Office on Oct. 19, 2007 and assigned Serial No. 2007-105833, and a Korean patent application filed in the Korean Intellectual Property Office on Nov. 28, 2007 and assigned Serial No. 2007-122340, the entire disclosures of each of which are hereby incorporated by reference.

BACKGROUND OF THE INVENTION

1. Field of the Invention

The present invention relates to a communication system. More particularly, the present invention relates to a system and method for transmitting/receiving a signal in a Broadband Wireless Access (BWA) communication system.

2. Description of the Related Art

Communication systems are under development to provide a variety of services including broadcasting, multimedia images, and multimedia messages. Studies are being made to provide services with different Quality of Service (QoS) requirements to users in future-generation communication systems. In addition, the developmental work of the future-generation communication systems is underway to provide a data service at or above 100 Mbps to fast moving users and at or above 1 Gbps to slow moving users beyond voice and packet data communication services.

Such a future-generation communication system is a mobile Internet system. The mobile Internet system is called Mobile Worldwide interoperability for Microwave Access (WiMAX) or Wireless Broadband (WiBro), and is compatible with Institute of Electrical and Electronics Engineers (IEEE) 802.16 communication systems.

The Mobile WiMAX system is making its way to the marketplace and now a Mobile WiMAX evolution communication system is under study. The Mobile WiMAX evolution system aims to support mobility of up to 300 km per hour, support variable bandwidths, and minimize overhead.

If the Mobile WiMAX communication system and the Mobile WiMAX evolution communication system are implemented, they should co-exist. Accordingly, there exists a need for a technique for operating a system that can enable co-existence of the Mobile WiMAX communication system and the Mobile WiMAX evolution communication system and efficiently operating the Mobile WiMAX evolution communication system, for example, a specified signal transmission/reception technique for transmitting broadcast information and providing information about a transmission frame structure in the Mobile WiMAX evolution communication system.

SUMMARY OF THE INVENTION

An aspect of the present invention is to address at least the above-mentioned problems and/or disadvantages and to provide at least the advantages described below. Accordingly, an aspect of the present invention is to provide a system and method for transmitting/receiving a signal in a communication system.

Another aspect of the present invention is to provide a signal transmission/reception system and method for, when a frame structure is changed, providing information about the changed frame structure in a BWA communication system.

A further aspect of the present invention is to provide a signal transmission/reception system and method in a wireless access communication system having a plurality of cells.

In accordance with an aspect of the present invention, a signal transmission method in a communication system using a superframe including a plurality of frames is provided. In the method, a transmitter determines to change a transmission time of a superframe header, when a structure of a superframe is changed, determines the transmission time of the superframe header according to a result of the determination to change the transmission time of the superframe header, transmits information about the determined transmission time to a receiver, and transmits the superframe header at the determined transmission time.

In accordance with another aspect of the present invention, a signal reception method in a communication system using a superframe including a plurality of frames is provided. In the method, a receiver receives information about a changed transmission time of a superframe header from a transmitter, when the structure of the superframe is changed, and receives the superframe header at the changed transmission time according to the received information.

In accordance with a further aspect of the present invention, a communication system using a superframe with a plurality of frames is provided. The system includes a transmitter and a receiver. The transmitter determines to change a transmission time of a superframe header, when a structure of the superframe is changed, determines the transmission time of the superframe header according to a result of the determination to change the transmission time of the superframe header, transmits information about the determined transmission time to the receiver, and transmits the superframe header at the determined transmission time. The receiver receives the information and receives the superframe header at the transmission time according to the received information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide frame structures for a communication system where a first communication system co-exists with a second communication system that is different from the first communication system. The exemplary embodiments of the present invention also provide a method for indicating a frame offset when the first communication system is replaced by the second communication system. The first and second communication systems can be an IEEE 802.16e system and an IEEE 802.16m system, respectively. In other words, the first and second communication systems can be Mobile WiMAX and Mobile WiMAX evolution, respectively.

While the exemplary embodiments of the present invention will be described in the context of the first communication system being an IEEE 802.16 communication system and the second communication system being a communication system advanced from the IEEE 802.16 communication system, the frame structures and the signal transmission/reception method of the present invention are also applicable to other communication systems, for example, Code Division Multiple Access (CDMA), Wideband Code Division Multiple Access (WCDMA), and Global System for Mobile Telecommunication (GSM) communication systems.

A communication scheme used in the first communication system is referred to as "a first communication scheme" and a communication scheme used in the second communication system is referred to as "a second communication scheme". The second communication system supports first and second modes. Both the first and second communication schemes are available in the first mode and only the second communication scheme is available in the second mode. In accordance with exemplary embodiments of the present invention, a first frame structure refers to a frame structure for the first mode and a second frame structure refers to a frame structure for the second mode.

Figure 1:
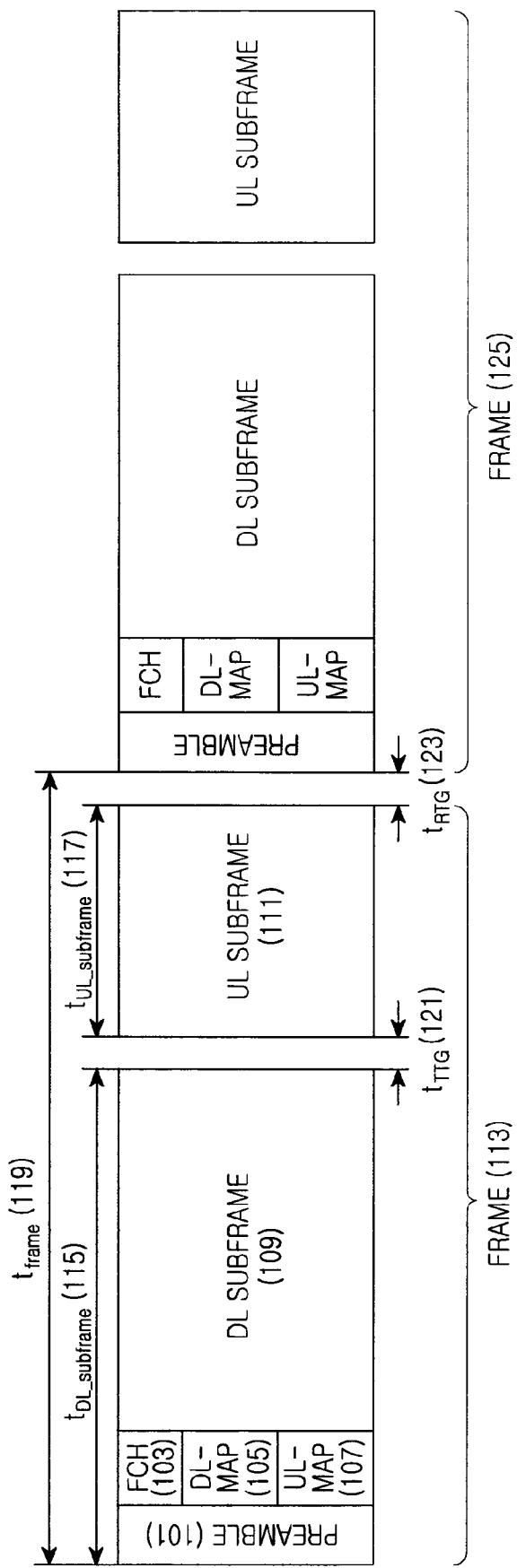
FIG. 1 illustrates a frame structure for a first communication system according to an exemplary embodiment of the present invention.

FIG. 1 illustrates a frame structure for the first communication system according to an exemplary embodiment of the present invention.

Referring to FIG. 1, a frame used in the first communication system includes a DL subframe 109 and an UpLink (UL) subframe 111. The DL subframe 109 has a preamble 101, a Frame Control Header (FCH) 103 carrying information about the configurations of MAPs, a DL-MAP 105 carrying resource allocation information relating to the DL subframe 109, and a UL-MAP 107 carrying resource allocation information relating to the UL subframe 111.

Frames 113 and 125 each are as long as $t_{frame}$ 119. The durations of the DL and UL subframes 109 and 111 are $t_{DL\_subframe}$ 115 and $t_{UL\_subframe}$ 117, respectively. A TTG of length $t_{TTG}$ 121 is interposed between the DL subframe 109 and the UL subframe 111, and an RTG of length $t_{RTG}$ 123 is interposed between the frames 113 and 125.

Figure 2A:
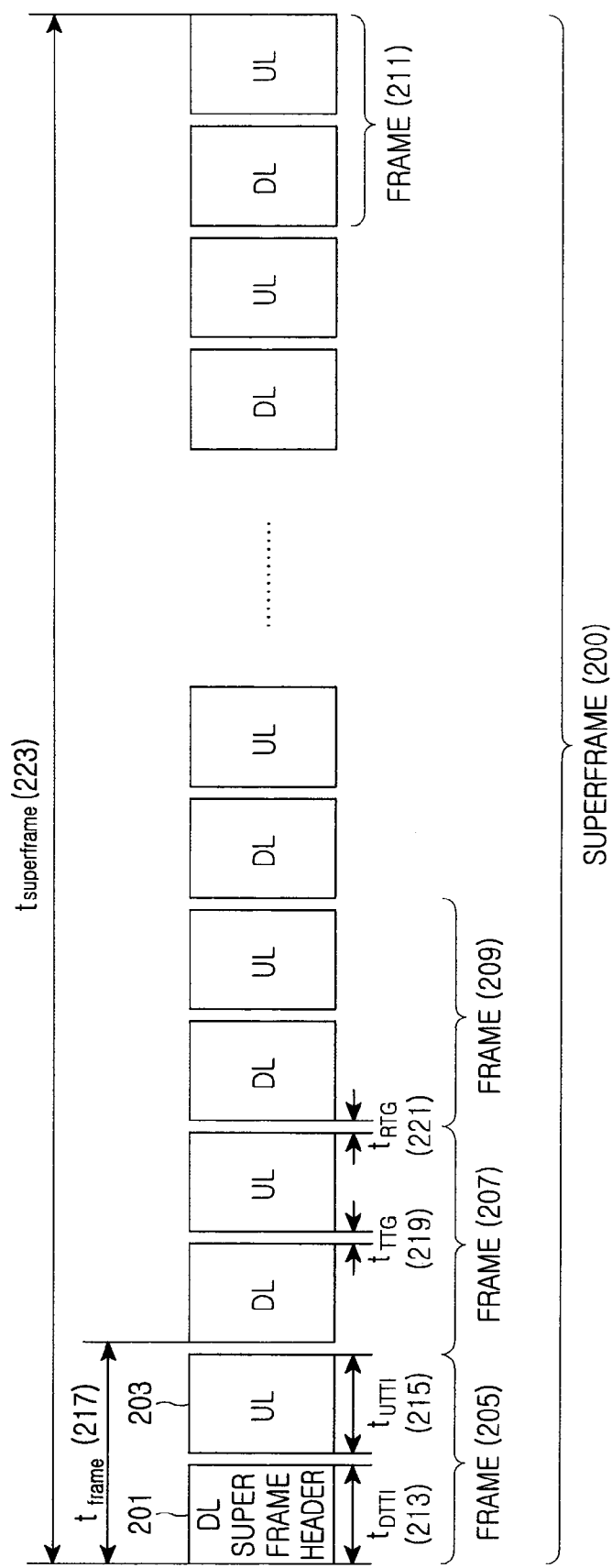
FIGS. 2A, 2B and 2C illustrate a second frame structure and a structure of a superframe header according to an exemplary embodiment of the present invention.
Figure 2B:
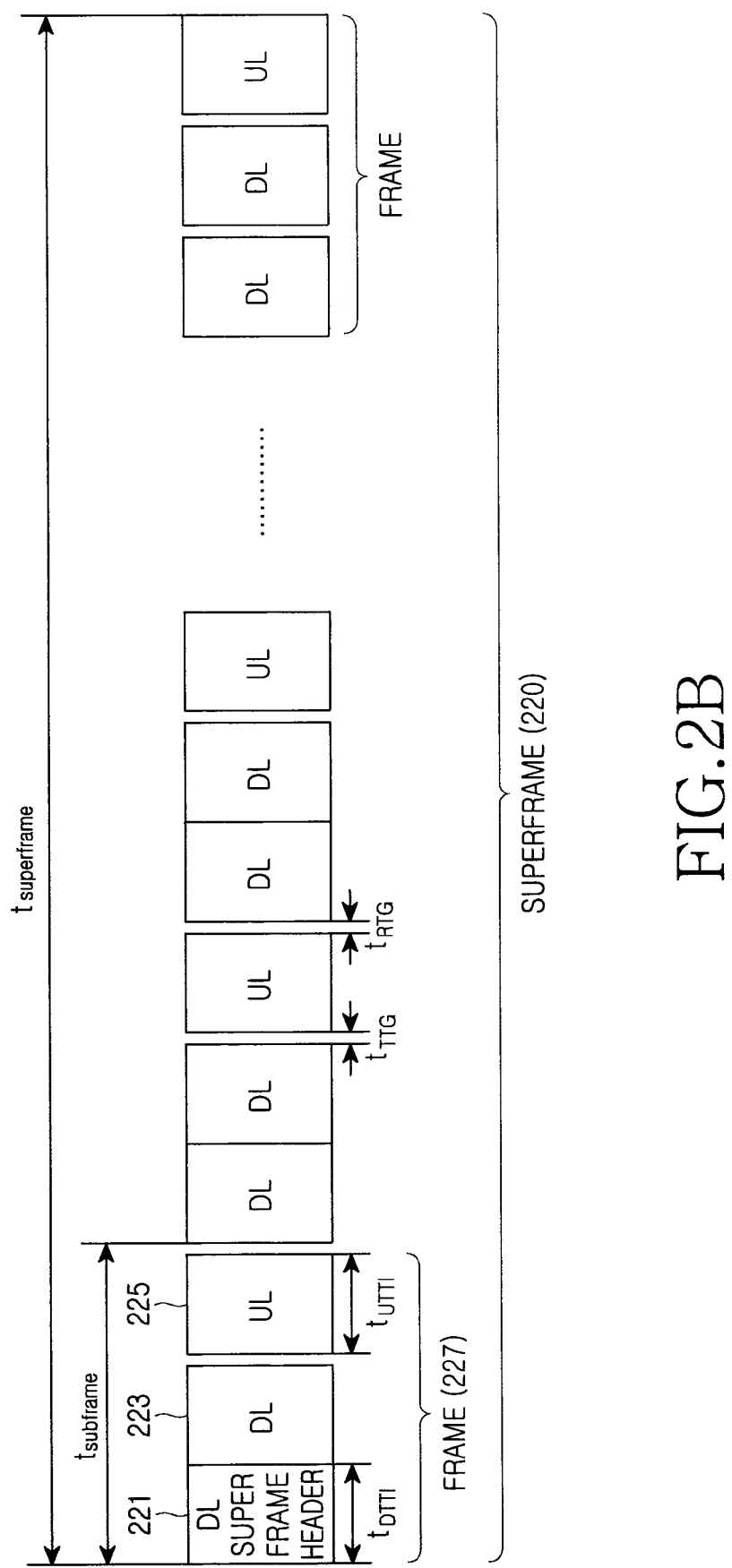

FIGS. 2A and 2B illustrate a second frame structure according to an exemplary embodiment of the present invention.

Referring to FIG. 2A, a second frame includes a superframe 200 with a plurality of frames 205, 207, 209, . . . 211. The frames 205, 207, 209, . . . 211 each have a DL subframe and a UL subframe. The DL subframe includes one or more (N2$_{DLTTI}$) DownLink Transmission Time Intervals (DL TTIs) 201 and the UL subframe includes one or more (N2$_{ULTTI}$) UL TTIs 203. The duration of the superframe 200 is $t_{superframe}$ 223 and the frame 205 is $t_{frame}$ 217 long. The lengths of the DL TTI 201 and the UL TTI 203 are $t_{DTTI}$ 213 and $t_{UTTI}$ 215, respectively.

A gap between a DL TTI and a UL TTI is a TTG of length $t_{TTG}$ 219 and the gap between frames, such as frame 207 and 209, is an RTG of length $t_{RTG}$ 221. The DL TTI and the UL TTI occupy predetermined time/frequency resources. For instance, one subframe may include six symbols, each symbol forming one TTI.

In the illustrated case of FIG. 2A, as one frame 205 includes one DL TTI 201 and one UL TTI 203, it has a Time Division Duplexing (TDD) frame structure with a 1:1 DL-UL ratio. On the other hand, as illustrated in FIG. 2B, a TDD frame structure with a 2:1 DL-UL ratio can be contemplated, in which one frame 227 includes two DL TTIs 221 and 223 and one UL TTI 225, for use in the second communication system.

Superframes 200 and 220 have DL superframe headers 201 and 221 in the DL TTIs 201 and 221 of their first frames 205 and 227. The DL superframe headers 201 and 221 may reside in DL TTIs of any other frame, instead of the DL TTIs of the first frames.

Figure 2C:
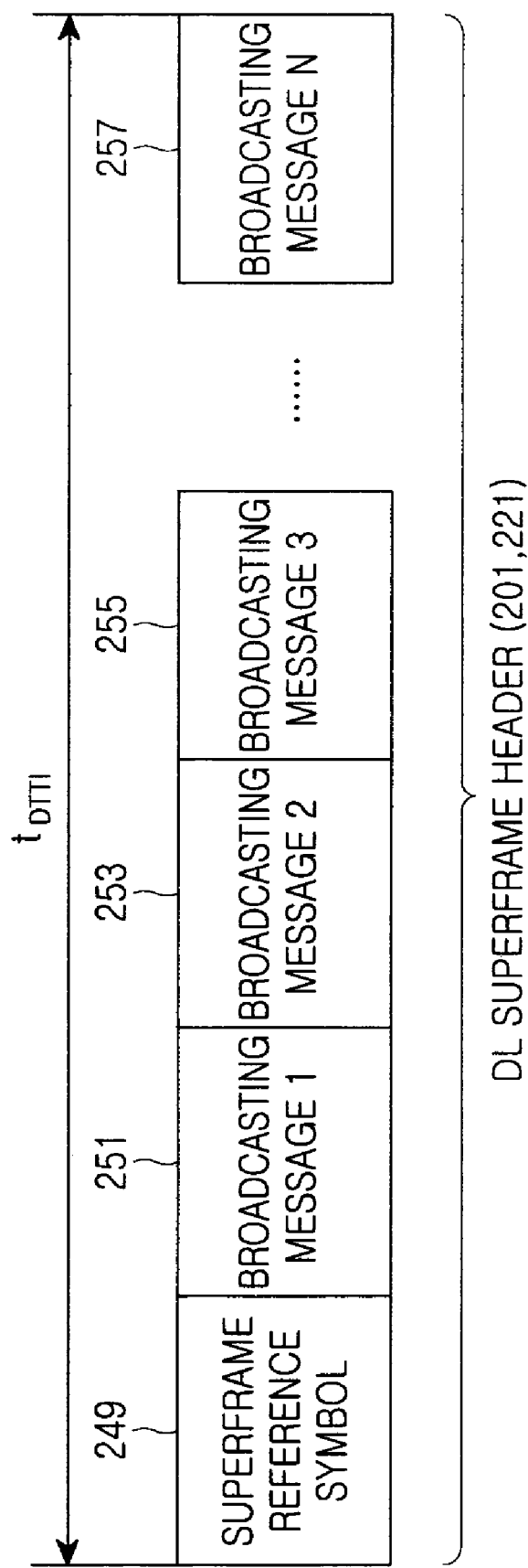

FIG. 2C illustrates a structure of DL superframe headers 201 and 221.

Referring to FIG. 2C, each of the DL superframe headers 201 and 221 has a plurality of Orthogonal Frequency Division Multiplexing (OFDM) symbols, which include a superframe reference symbol 249 carrying a superframe reference signal for system synchronization and broadcasting messages 251, 253, 255, ... 257 carrying information about the configuration of the superframe. A channel that delivers the broadcasting messages is called a Broadcast CHannel (BCH).

A first-mode BS generates a frame and transmits it to an MS of the second communication system. The MS acquires synchronization by receiving the superframe symbol 249 of the superframe header 201 or 221, detects frame configuration information from the broadcasting messages 251, 253, 255, ... 257, and receives a DL TTI from the BS or transmits a UL TTI to the BS according to the frame configuration information. The frame configuration information may specify a frame length, a TDD DL subframe-UL subframe (DL-UL) ratio, a TTG/RTG length and the like.

Figure 3:
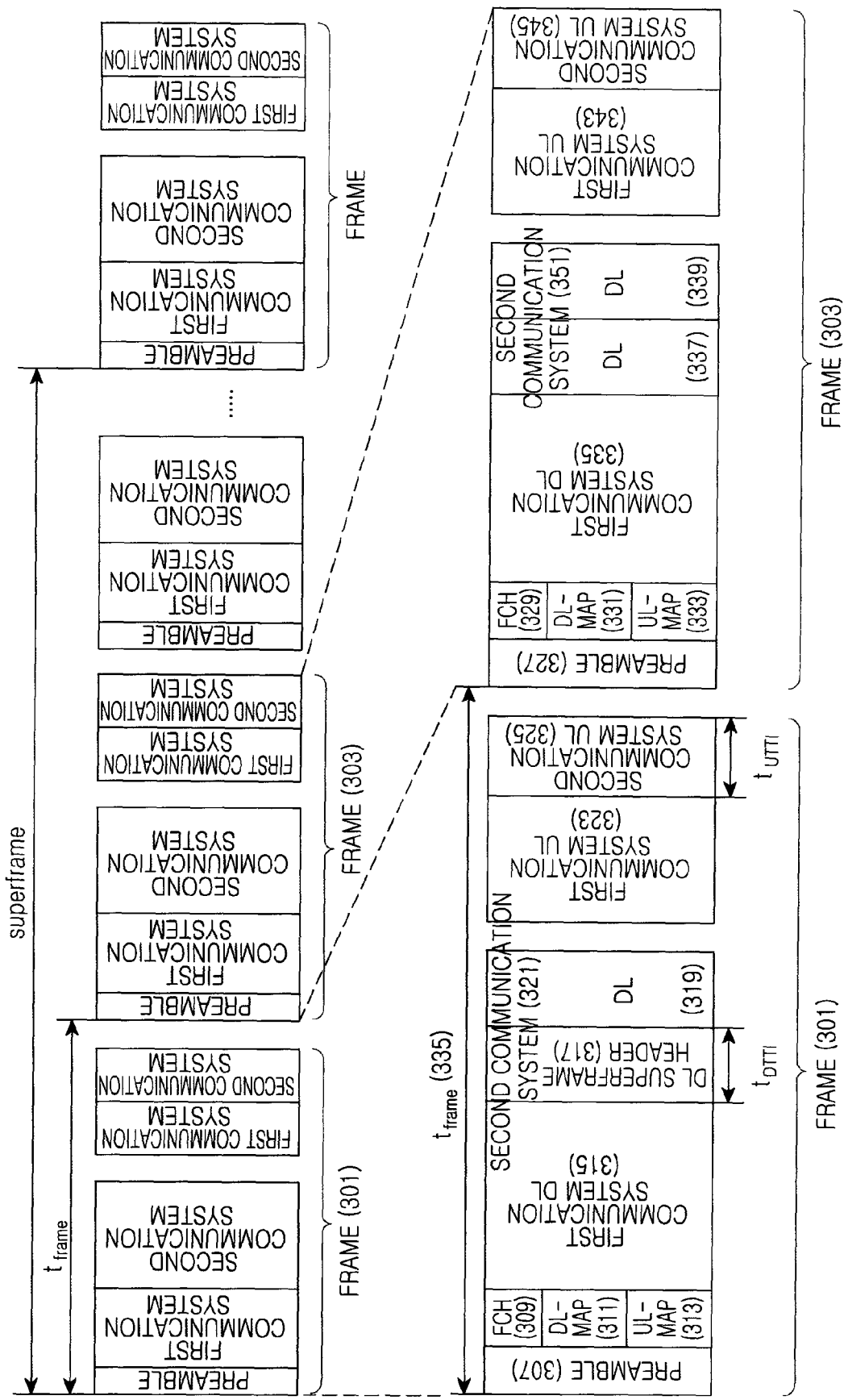
FIG. 3 illustrates a first frame structure for a second communication system according to an exemplary embodiment of the present invention.

FIG. 3 illustrates a first frame structure for the second communication system according to an exemplary embodiment of the present invention.

In accordance with an exemplary embodiment of the present invention, the second communication system supports the first communication system. In other words, a BS in the first/second communication system supports an MS in the first communication system. In this context, the frame structure illustrated in FIG. 3 is proposed to enable communications in both the first and second communication schemes when the second communication system operates in the first mode.

The first frame structure is designed for mutual compatibility between the first and second communication systems, so that the superframe structure of the second frame used in the second communication system is incorporated into the frame structure used in the first communication system.

From among many frame structures available when the second communication system operates in the second mode, a TDD frame structure with a 1:1 DL-UL ratio will be referred to as an example.

Referring to FIG. 3, a current frame 301 is divided into a DL subframe and a UL subframe with a TTG in between and the current frame 301 is distinguished from a next frame 303 by an RTG.

The DL subframe includes a preamble 307, an FCH 309, a DL-MAP 311, a UL-MAP 313, a DL data burst area for the first communication system 315 (referred to as a first communication system area 315), and DL areas for the second communication system 321 (referred to as second communication system area 321). The second communication system area 321 includes a DL superframe header 317 and a DL data burst area 319 for the second communication system 321.

The UL subframe includes a UL data burst area for the first communication system 323 and a UL data burst area for the second communication system 325.

The DL superframe header 317 is $t_{DTTI}$ long and the UL data burst area for the second communication system 325 can be $t_{UTTI}$ long.

The next frame 303 also includes a preamble 327, an FCH 329, a DL-MAP 331, a UL-MAP 333, a first communication system area 335, and second communication system area 351 including DL data burst areas 337 and 339, and includes UL data burst areas for the first and second communication systems 343 and 345 in a UL subframe.

While the DL superframe header 317 is in the first frame 301 in the illustrated case of FIG. 3, it may be positioned in any other frame, for example, in the frame 303.

Although the DL superframe header 317 may include all of a superframe reference symbol and broadcasting messages as stated before, it can include the broadcasting messages only. In the latter case, the MS acquires synchronization to the BS using a preamble for the first communication system and then locates a BCH position by blind detection. Many methods are available for the blind detection of the BCH position, which is beyond the scope of the present invention and thus will not be detailed herein.

Hence, the following description is made in the context of a communication system designed to detect the BCH position by blind detection, and takes into account the case where the DL superframe header 317 includes all of the superframe reference symbol and the broadcasting messages and the case where the DL superframe header 317 includes only the broadcasting messages.

If the first communication system is replaced by the second communication system, a frame structure dedicated to the second communication system is needed. Accordingly, a method for utilizing a TTG/RTG and a method for utilizing temporary non-transmission TTIs of the second communication system among DL/UL TTIs are needed, in order to modify a frame structure for use in the second communication system only.

Figure 4A:
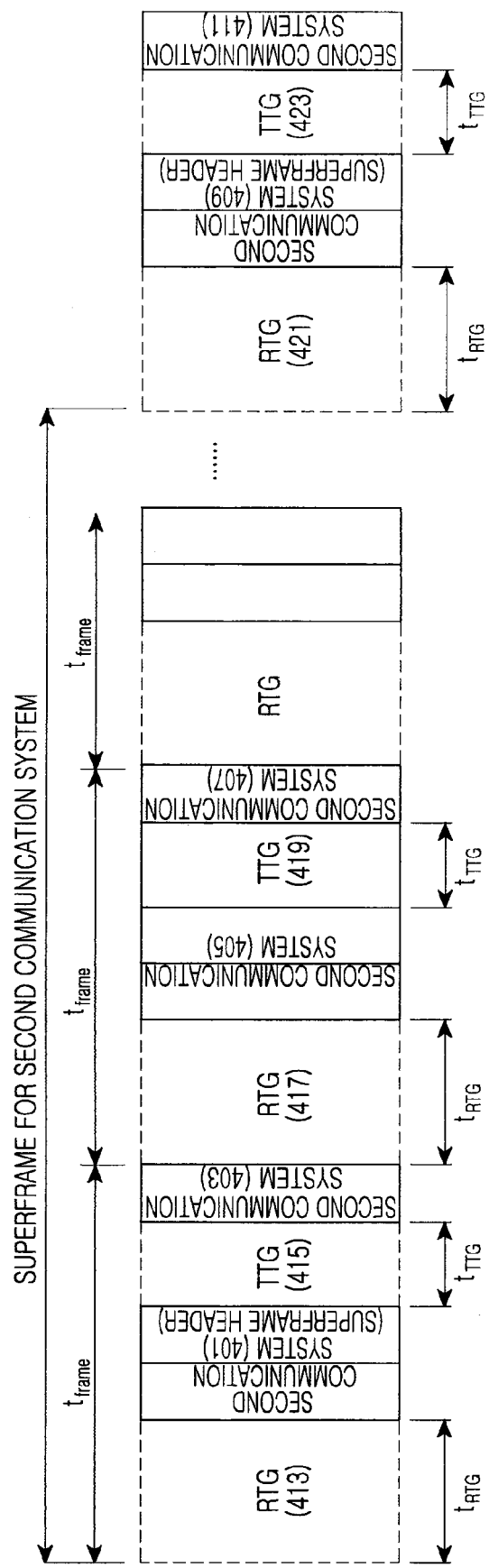
FIGS. 4A and 4B illustrate a frame structure using a Transmit/receive Transition Gap/Receive/transmit Transition Gap (TTG/RTG) and a frame structure using a DownLink/UpLink (DL/UL) gap for the second communication system according to exemplary embodiments of the present invention.

FIG. 4A illustrates a frame structure using a TTG/RTG for the second communication system according to an exemplary embodiment of the present invention.

Referring to FIG. 4A, frames serving only the second communication system still have super frame headers, DL data burst areas, and UL data burst areas 401 to 411 that are designed for the second communication system. Notably, an RTG 413 substitutes for DL areas designed for the first communication system, i.e. the areas 307 to 315 illustrated in FIG. 3. In addition, UL areas for the first communication system, i.e. the areas 323 and 325 illustrated in FIG. 3 are changed to a TTG 415. RTGs 417 and 421 and TTGs 419 and 423 are created in the same manner. This frame structure avoids interference between the first communication system and the second communication system during signal transmission/reception.

Figure 4B:
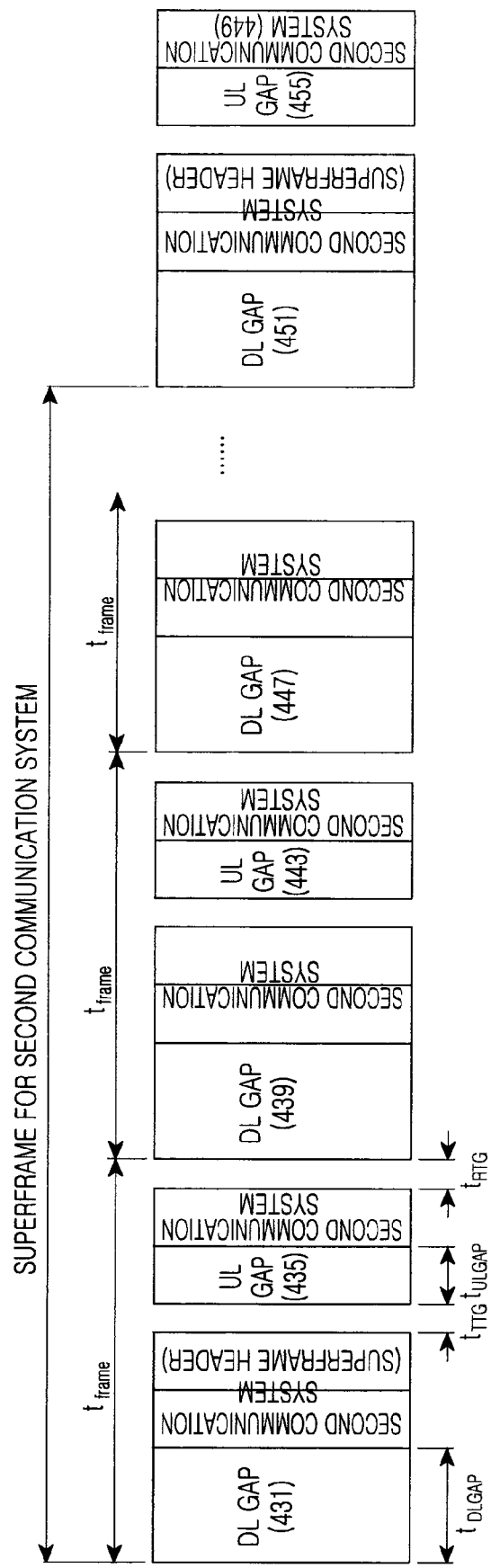

FIG. 4B illustrates a frame structure using a DL/UL gap for the second communication system according to another exemplary embodiment of the present invention.

Referring to FIG. 4B, as in the frame structure according to the first exemplary embodiment of the present invention, a frame according to the second exemplary embodiment of the present invention has a DL gap 431 and a UL gap 435 in the place of the DL (i.e. the areas 307 to 315 illustrated in FIG. 3) and UL areas (i.e. the areas 323 and 325 illustrated in FIG. 3) set for the first communication system. Since no signals are transmitted/received in the DL gap and the UL gap, no signal interference occurs between the first and second communication systems. DL gaps 439, 447 and 451 and UL gaps 443 and 455 are created in the same manner.

Figure 5:
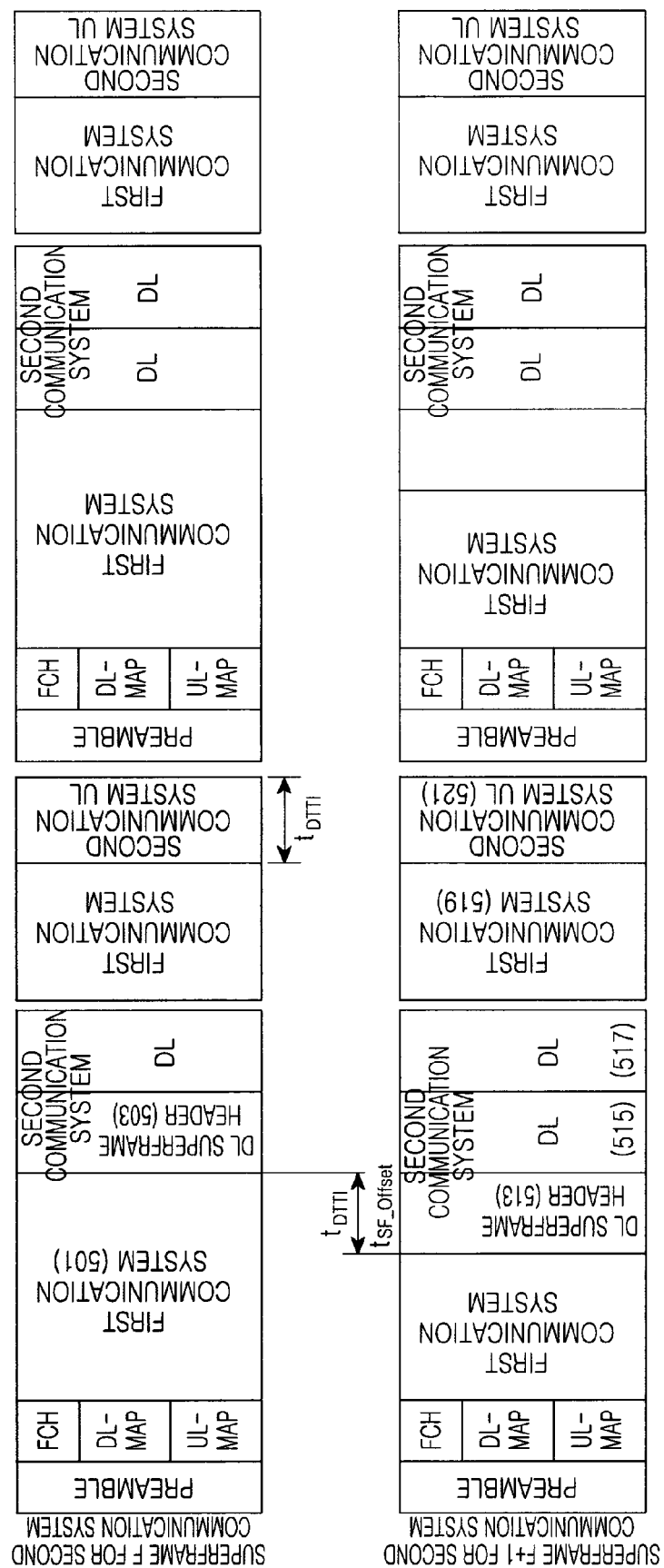
FIG. 5 illustrates a first frame structure according to an exemplary embodiment of the present invention.

FIG. 5 illustrates a first frame structure according to an exemplary embodiment of the present invention.

Referring to FIG. 5, the upper first frame structure can be modified to the lower one. If users decrease in number in the first communication system and increase in number in the second communication system, the first frame should be modified such that the first communication system area is reduced and the second communication area is increased. Therefore, part of a first communication system area 501 in the upper first frame structure is used as a DL superframe header 513 in the lower first frame structure. While not illustrated in FIG. 5, the UL area can be modified, as well as the DL area.

As described above, two cases can be considered to operate the frame. In one case where the DL superframe header 513 includes a superframe reference symbol and broadcasting messages, the MS acquires synchronization to the BS using a superframe reference signal delivered in the DL superframe header 513, receives a BCH carrying broadcasting messages, and then receives DL/UL TTIs 515, 517, 519 and 521.

In the other case where the DL superframe header 513 includes only the broadcasting messages, the MS acquires synchronization to the BS using the preamble of the first communication system area, receives the BCH based on BCH position information that has been detected by blind detection, and then receives the DL/UL TTIs 515, 517, 519 and 521. Although before superframe F, the superframe header of one frame is spaced apart from the next superframe by $t_{superframe}$, the spacing between the superframe header 503 of superframe F and that 513 of superframe F+1 is $t_{SF\_offset}$. As illustrated in FIG. 5, since the second communication system area becomes wide, the relative position of the superframe header is changed, which in turn changes the positions of the DL/UL TTIs.

Thus, to give prior knowledge of the changed configuration of the first frame to the MS, the BS generates a message including frame configuration information about the changed first frame structure and transmits it to the MS before the frame structure modification. The MS receives the BCH and the DL/UL TTIs 515, 517, 519 and 521 according to the frame configuration information without depending on the superframe reference signal or the blind-detected BCH position information. The MS does not need to depend on the superframe reference signal because reception of the superframe reference symbol designed for initial synchronization acquisition takes a considerable amount of time. Depending on the superframe reference signal, the MS is burdened by having to process the superframe reference signal quickly. The blind detection of the BCH position information also imposes a constraint on the MS.

The MS locates the BCH and the DL/UL TTIs based on the frame configuration information. In the superframe header 201 or 221 of the second communication system illustrated in FIG. 2C, the superframe reference symbol 249 precedes the BCH carrying the broadcasting messages 251, 253, 255, ... 257, followed by DL/UL TTIs. Hence, the positions of the BCH and DL/UL TTIs are known from the position information about the superframe reference symbol. Therefore, the MS should be able to compute $t_{SF\_offset}$. Even when the superframe header 201 or 221 of the second communication system includes only the BCH, the MS should be able to compute $t_{SF\_offset}$.

The MS computes $t_{SF\_offset}$ using information about the number of the DL TTIs set in the frame configuration information and locates the BCH and the DL/UL TTIs using $t_{SF\_offset}$ in the above-described two cases, that is, in the presence of the superframe reference symbol 249 and the BCH in the superframe header 201 or 221 and in the presence of only the BCH in the superframe header 201 or 221.

If the displacement of the superframe reference symbol (i.e. the superframe reference signal) or the displacement of the superframe header is an integer multiple of $t_{DTTI}$, $t_{SF\_offset}$ is computed by $$t_{SF\_offset} = t_{superframe} \cdot \Delta N2_{DLTTI} \times t_{DTTI} \qquad (1)$$

where $t_{SF\_offset}$ is the interval between the superframe headers of the current and next superframes, i.e. the interval between the superframe header 503 of superframe F and that 513 of superframe F+1, $t_{superframe}$ is a superframe length in the second communication system, $\Delta N2_{DLTTI}$ is the difference in a number between the DL TTIs of superframes F and F+1, and $t_{DTTI}$ is the length of a DL TTI.

Figure 6:
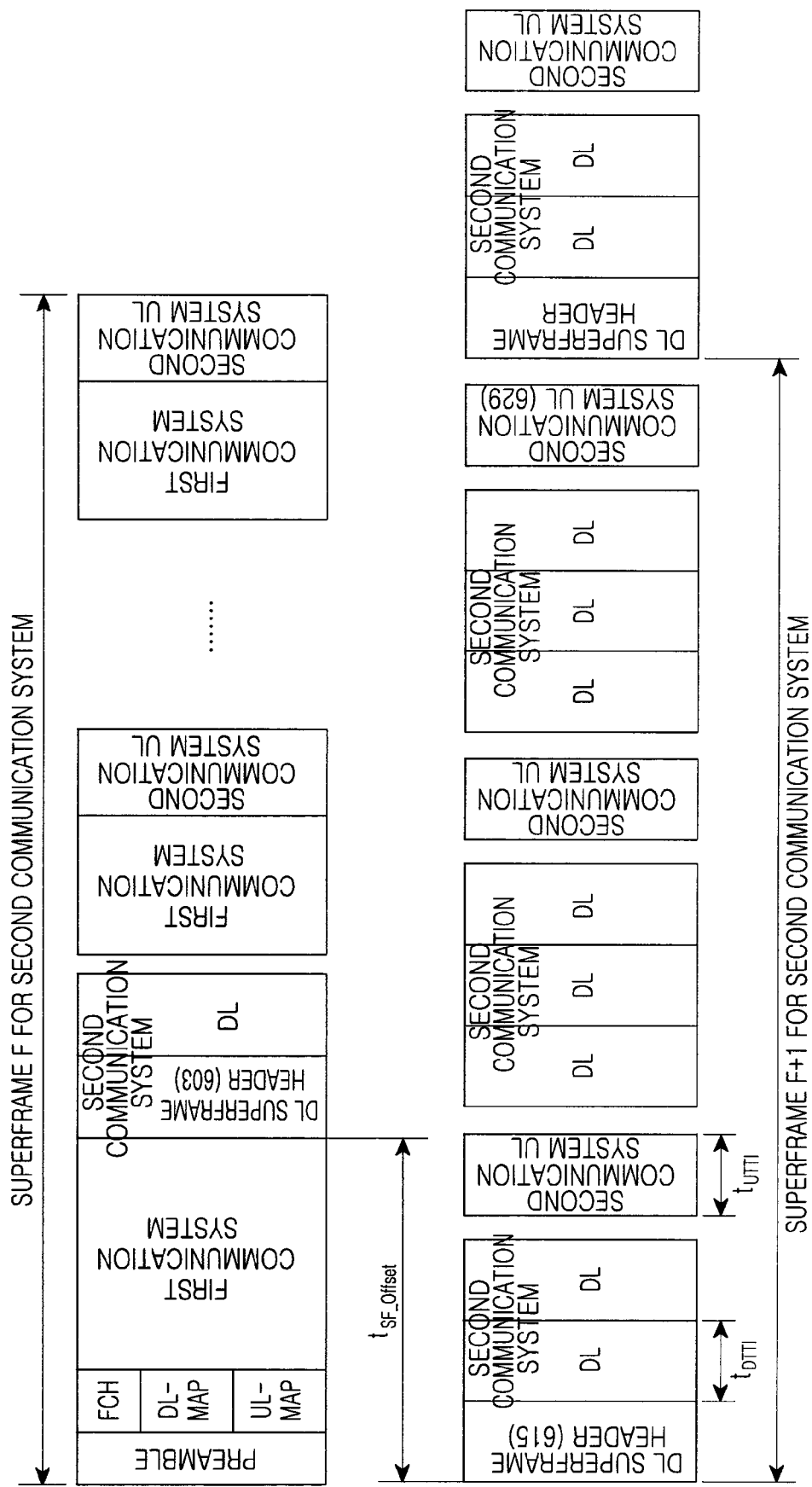
FIG. 6 illustrates a modification of a first frame structure to a second frame structure according to an exemplary embodiment of the present invention.

FIG. 6 illustrates a modification of a first frame structure to a second frame structure according to an exemplary embodiment of the present invention.

Referring to FIG. 6, when the first frame structure is modified to the second frame structure, the relative position of the superframe reference signal or the superframe header is changed. Hence, the BS transmits frame configuration information about the changed frame structure to the MS so that the MS obtains knowledge of the changed frame structure before the structure modification.

If the displacement of the superframe reference signal or the superframe header is not an integer multiple of $t_{DTTI}$, the BCH and the TTIs cannot be located simply with information about the number of the DL TTIs, as done in equation (1). In this case, the BS should transmit $t_{SF\_offset}$ or its equivalent information to the MS.

Regardless of whether the displacement of the superframe reference signal or the superframe header is or is not an integer multiple of $t_{DTTI}$, $t_{SF\_offset}$ can be computed by $$\begin{aligned} t_{SF\_offset} &= t_{superframe} \cdot t_{DLGAP} \\ &= t_{superframe} \cdot \Delta N2_{DLTTI} \times t_{DTTI} - t_{DLGAP\_delta} \end{aligned} \qquad (2)$$

where $t_{SF\_offset}$ is the interval between the superframe header 603 of superframe F and superframe header 615 of superframe F+1, $t_{superframe}$ is the length of a superframe, $\Delta N2_{DLTTI}$ is the difference in a number between the DL TTIs of superframes F and F+1, and $t_{DTTI}$ is the length of a DL TTI. Herein, $t_{DLGAP\_delta} = t_{DLGAP} - \Delta N2_{DLTTI} \times t_{DTTI}$ where $t_{DLGAP}$ is the time difference between the preamble of the first communication system and the superframe reference signal or superframe header of the second communication system. If $t_{DLGAP\_delta}$ is 0, which means that the fist communication system area still exists, equation (2) is equal to equation (1). Therefore, $t_{SF\_offset}$ can be computed by equation (2) regardless of whether the displacement of the superframe reference signal or the superframe header is or is not an integer multiple of $t_{DTTI}$.

Thus, the BS can generate superframe offset information corresponding to $t_{SF\_offset}$ based on the parameters of equation (2) and transmit the superframe offset information to the MS. The superframe offset information includes the following information.

1) $t_{SF\_offset}$

2) $t_{DLGAP}$, the time difference between the preamble of the first communication system and the superframe reference signal or the superframe header of the second communication system.

3) $\Delta N2_{DLTTI}$ and $t_{DLGAP\_delta}$ (if $t_{DLGAP\_delta}$=0, equation (1)).

4) a $t_{SF\_offset}$ indicator indicating generation of $t_{SF\_offset}$.

The BS can transmit the $t_{SF\_offset}$ indicator together with $t_{DLGAP}$, $t_{DLGAP\_delta}$ and $\Delta N2_{DLTTI}$ or only the $t_{SF\_offset}$ indicator to the MS.

In the latter case, the MS detects the preamble of the first communication system and the superframe reference signal or superframe header of the second communication system, computes the relative time difference between them, i.e. $t_{DLGAP}$ and calculates $t_{SF\_offset}$, before the frame configuration information is changed. The MS can use equation (2) in calculating $t_{SF\_offset}$. When receiving the $t_{SF\_offset}$ indicator, the MS locates the superframe reference symbol, and the following BCH and DL/UL TTIs according to $t_{SF\_offset}$. If the superframe header of the second communication system includes the BCH only, except for the superframe reference signal, the MS locates the superframe header, i.e. the BCH and the following DL/UL TTIs according to $t_{SF\_offset}$. In the mean time, the BS can additionally transmit a frame number indicating the generation time of $t_{SF\_offset}$ to the MS.

The BS can transmit the superframe offset information to the MS in the following manners.

1) on the BCH.
2) by an in-band Medium Access Control (MAC) message in a traffic DL TTI.
3) by overriding a signal corresponding to $t_{SF\_offset}$ on the preamble of the first communication system (i.e. by overriding a physical signal corresponding to $t_{SF\_offset}$ on a conventional preamble signal).
4) in the superframe reference signal of the communication system (i.e. superframe reference signals corresponding to $t_{SF\_offset}$ values are defined and a superframe reference signal corresponding to a specific $t_{SF\_offset}$ value is transmitted).

The description of FIG. 6 is valid not only when the superframe reference signal is positioned in the first DL TTI of a frame as illustrated in FIG. 6, but also when it is in the last DL TTI of the frame.

If the second communication system has a plurality of cells, the MS should search for a cell to camp on and acquire frame synchronization to the cell.

Figure 7:
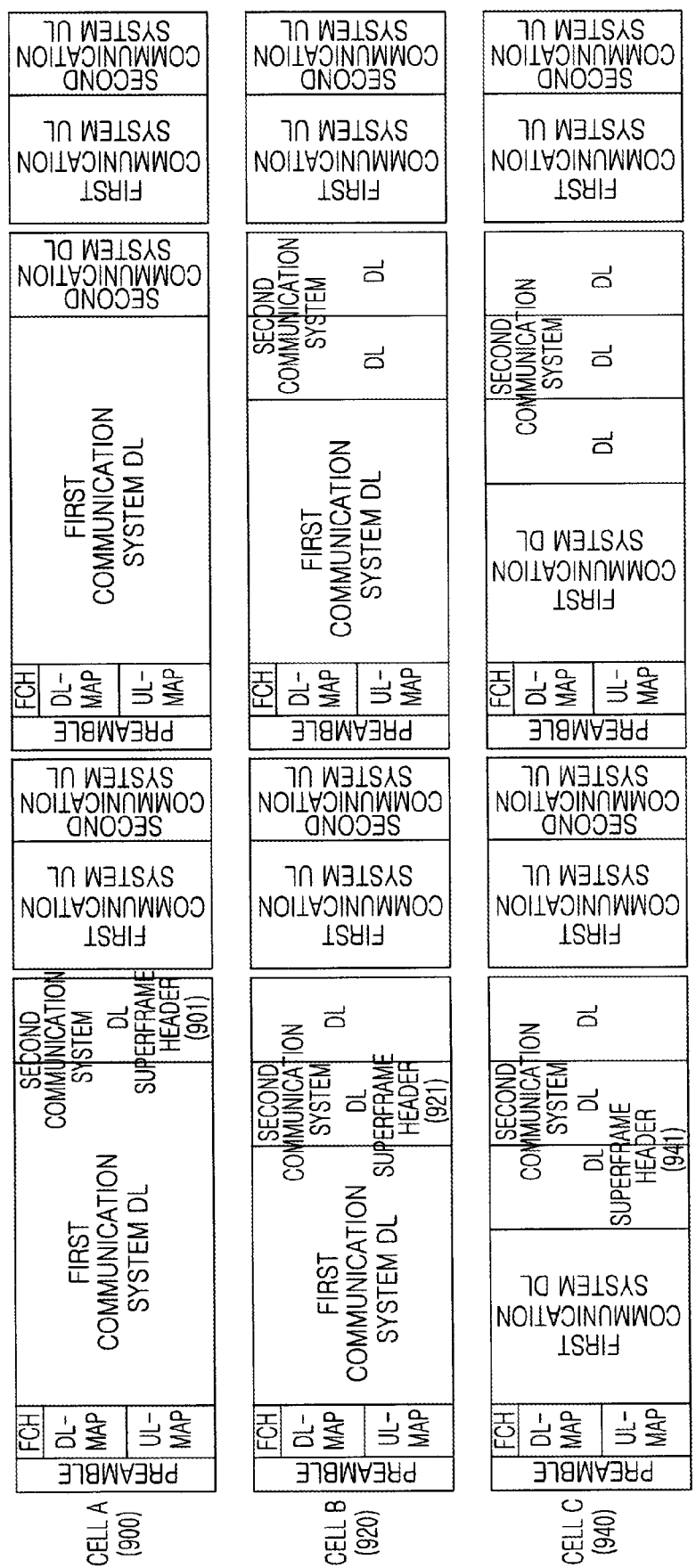
FIG. 7 illustrates a frame structure for a communication system having a plurality of cells when it operates in a first mode according to an exemplary embodiment of the present invention.

FIG. 7 illustrates a frame structure for a communication system having a plurality of cells when it operates in the first mode according to an exemplary embodiment of the present invention.

Referring to FIG. 7, the communication system includes cells 900, 920 and 940 (Cell A, Cell B and Cell C) that can transmit TDD frames designed in various structures according to their DL-UL ratios. Cell A transmits a frame with a ratio between the DL areas of the first and second communication systems being 1:1 (a first-second DL ratio being 1:1), Cell B transmits a frame with a first-second DL ratio being 1:2, and Cell C transmits a frame with a first-second DL ratio being 1:3. DL superframe headers 901, 921 and 942 each including a superframe reference symbol for cell search and frame synchronization acquisition and broadcasting messages carrying frame configuration information are transmitted at different times in the different cells 900, 920 and 940.

Therefore, the MS should search all of Cell A 900, Cell B 920 and Cell C 940 to discover its serving cell. In addition, during handover from the serving cell including a serving BS to another cell that will provide a better service than the serving cell, system DL overhead increases and the operational complexity of the MS also increases because of the DL superframe headers 901, 921 and 941 transmitted at different times.

In this context, exemplary embodiments of the present invention propose three schemes for enabling the MS to efficiently search for a cell to camp on.

One of the schemes is to configure the frames such that the cells transmit the superframe reference symbols of the superframe headers physically at the same time, for synchronization acquisition. Another is to configure the frames such that the cells transmit the superframe headers physically at the same time, for synchronization acquisition. The other scheme is that the MS detects the superframe header of the second communication system using the preamble signal of the first communication system.

Figure 8:
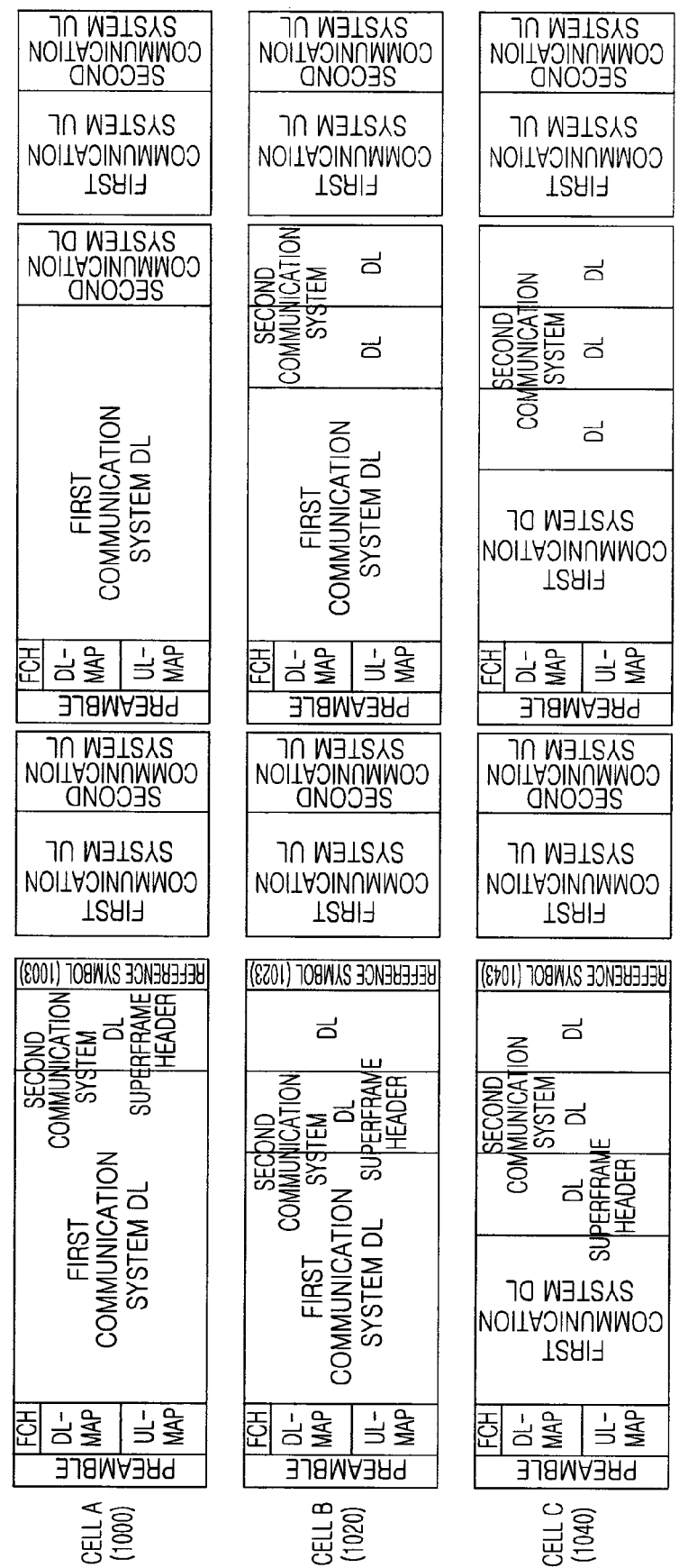
FIG. 8 illustrates frame structures including reference symbols transmitted at the same time according to an exemplary embodiment of the present invention.

With reference to FIG. 8, a description will first be made of the first scheme.

FIG. 8 illustrates frame structures including reference symbols transmitted at the same time according to an exemplary embodiment of the present invention.

Referring to FIG. 8, cells 1000, 1020, and 1040 (Cell A, Cell B and Cell C) transmit superframe reference symbols 1003, 1023, and 1043 at the same time. Hence, the MS can select its serving cell by one cell search and acquire frame synchronization to the serving cell.

While the superframe reference symbols 1003, 1023 and 1043 are transmitted at the ends of the DL subframes of the second communication system in the illustrated case of FIG. 8, they can be transmitted in any part of the DL subframes of the second communication system as long as their transmissions are simultaneous.

Figure 9:
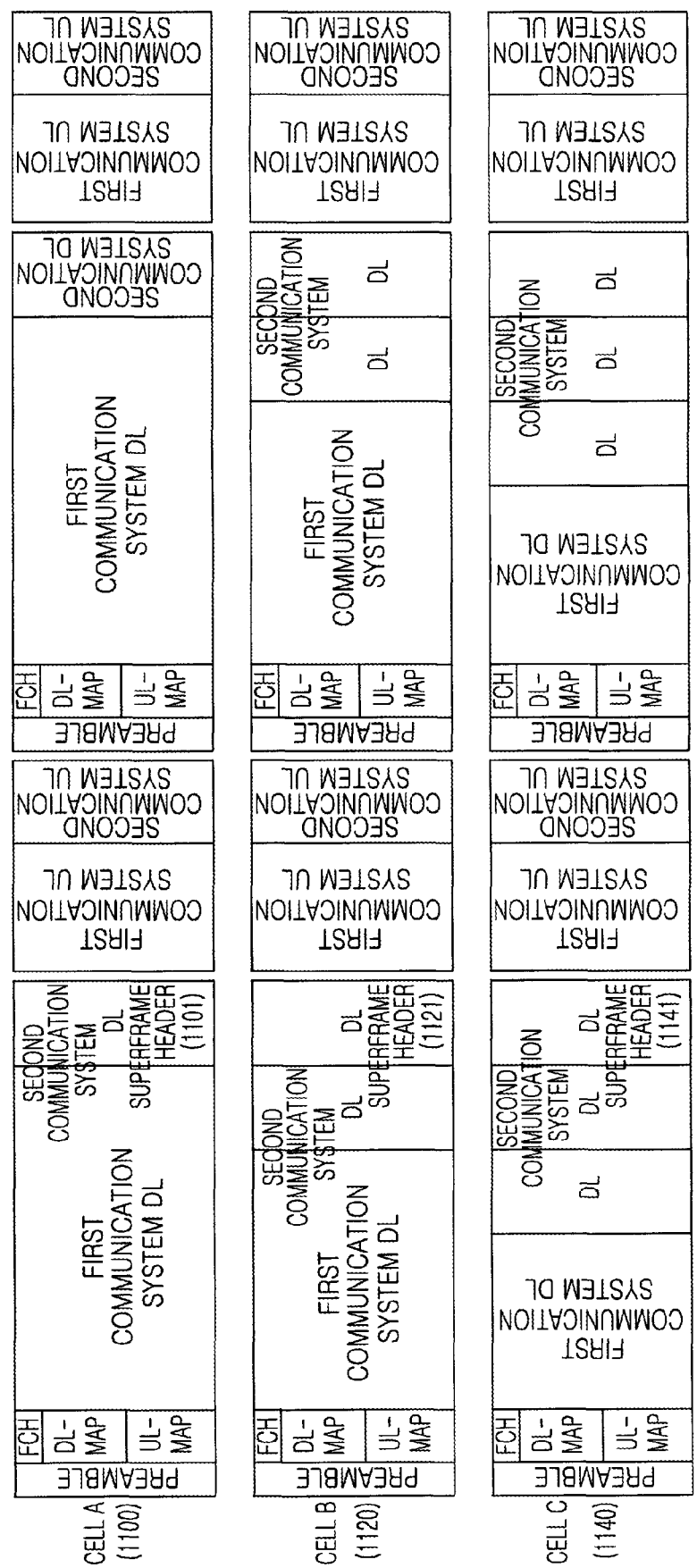
FIG. 9 illustrates frame structures including DownLink (DL) superframe headers transmitted at the same time according to an exemplary embodiment of the present invention.

FIG. 9 illustrates frame structures including DL superframe headers transmitted at the same time according to an exemplary embodiment of the present invention.

Referring to FIG. 9, cells 1100, 1120 and 1140 (Cell A, Cell B and Cell C) transmit DL superframe headers 1101, 1121 and 1141 at the same time. Hence, the MS can select its serving cell by one cell search and acquire frame synchronization to the serving cell.

While the DL superframe headers 1101, 1121 and 1141 are transmitted at the ends of the DL subframes of the second communication system in the illustrated case of FIG. 9, they can be transmitted in any part of the DL subframes of the second communication system as long as their transmissions are simultaneous.

Figure 10:
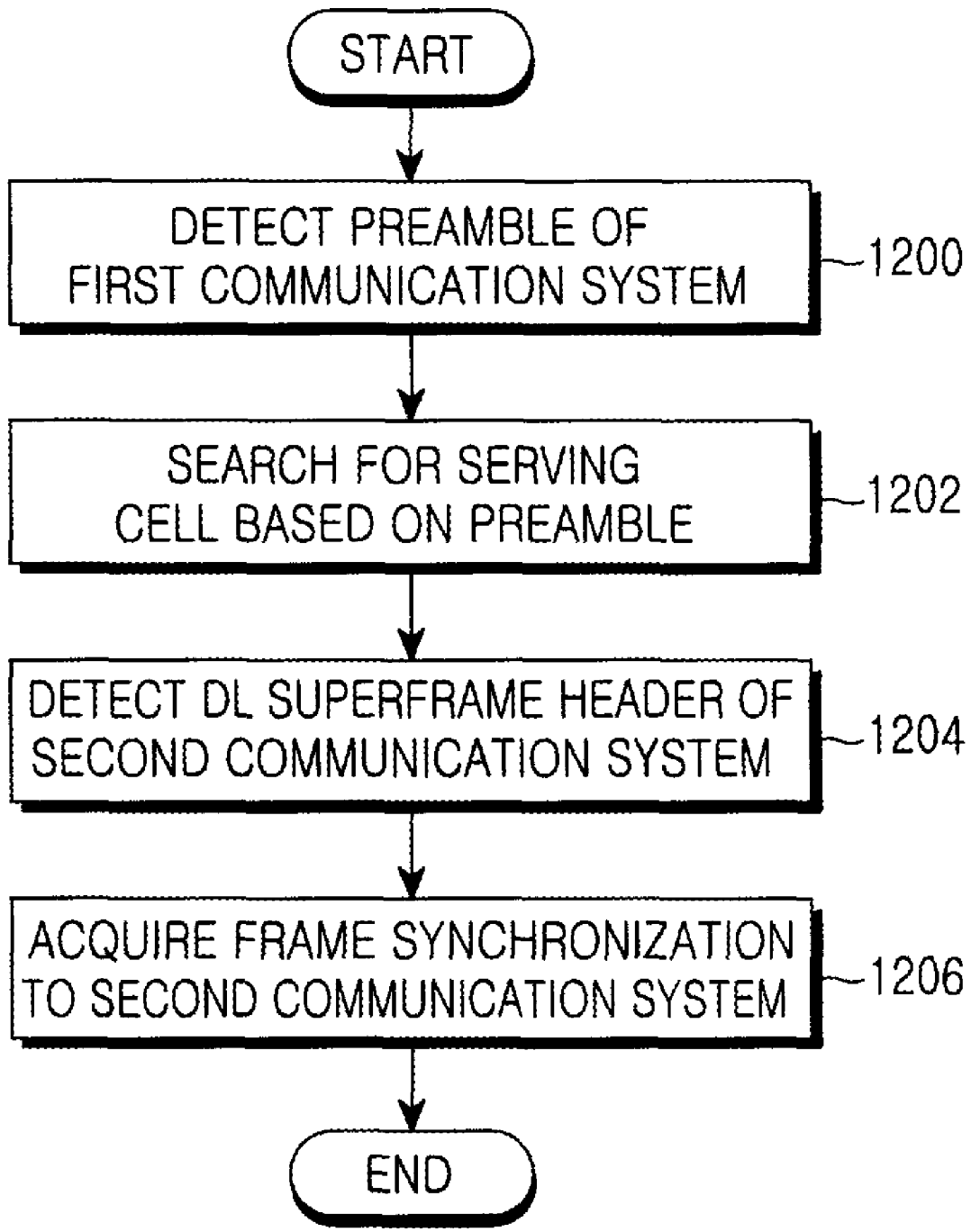
FIG. 10 is a flowchart illustrating an operation of a Mobile Station (MS) when the second communication system includes a plurality of cells according to an exemplary embodiment of the present invention.

FIG. 10 is a flowchart illustrating an operation of an MS, when the second communication system includes a plurality of cells according to an exemplary embodiment of the present invention.

Referring to FIG. 10, the MS detects a preamble signal of the first communication system in step 1200 and searches for its serving cell using the preamble signal in step 1202.

In step 1204, the MS detects a DL superframe header of the second communication system from the cell. Then the MS acquires frame synchronization to the second communication system in step 1206.

Figure 11:
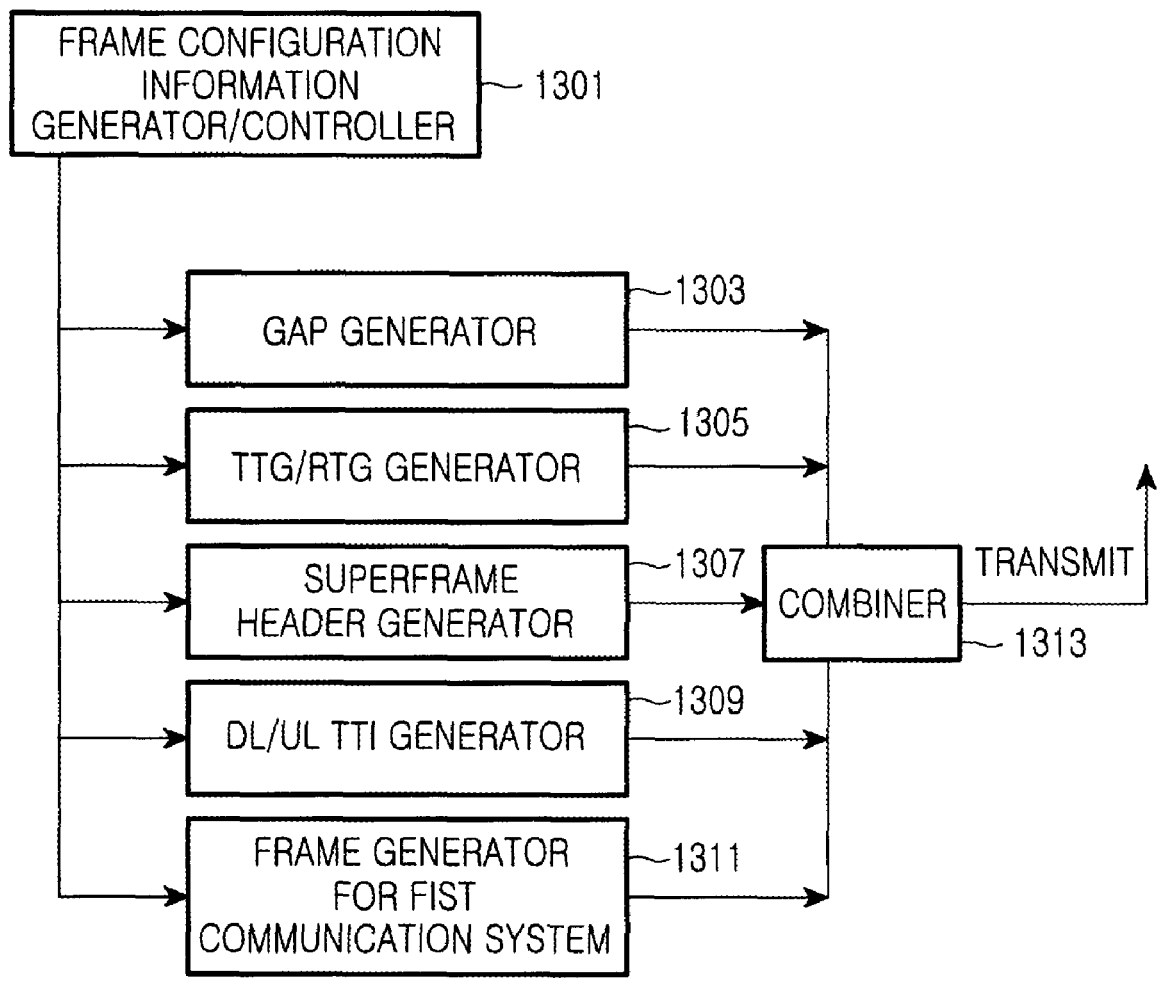
FIG. 11 is a block diagram of a transmitter of a Base Station (BS) according to an exemplary embodiment of the present invention.

FIG. 11 is a block diagram of a transmitter of a BS according to an exemplary embodiment of the present invention.

Referring to FIG. 11, the BS transmitter includes a frame configuration information generator/controller 1301, a gap generator 1303, a TTG/RTG generator 1305, a superframe header generator 1307, a DL/UL TTI generator 1309, a frame generator for the first communication system 1311, and a combiner 1313.

The frame configuration information generator/controller 1301 generates frame configuration information including $t_{SF\_offset}$, a superframe length, and a DL-UL ratio and controls the gap generator 1303, the TTG/RTG generator 1305, the superframe header generator 1307, the DL/UL TTI generator 1309, and the frame generator for the first communication system 1311. If the frame configuration information is transmitted on a BCH, in an in-band MAC message during a traffic DL/UL TTI, by overriding it on a preamble signal of the first communication system, or in a superframe reference signal of the second communication system, it can be generated in a generator corresponding to the transmission scheme for the frame configuration information.

The gap generator 1303, the TTG/RTG generator 1305, the superframe header generator 1307, the DL/UL TTI generator 1309, and the frame generator for the first communication system 1311 generate elements for a frame of the second communication system under the control of the frame configuration information generator/controller 1301. The superframe header generator 1307 includes a superframe reference signal extractor. Therefore, the superframe header generator 1307 outputs a superframe header and can output a superframe reference signal extracted by the reference signal extractor.

The combiner 1313 generates a first frame by combining the frame elements of the second/first communication system received from the gap generator 1303, the TTG/RTG generator 1305, the superframe header generator 1307, the DL/UL TTI generator 1309, and the frame generator for the first communication system 1311 and transmits the first frame to the MS.

Figure 12:
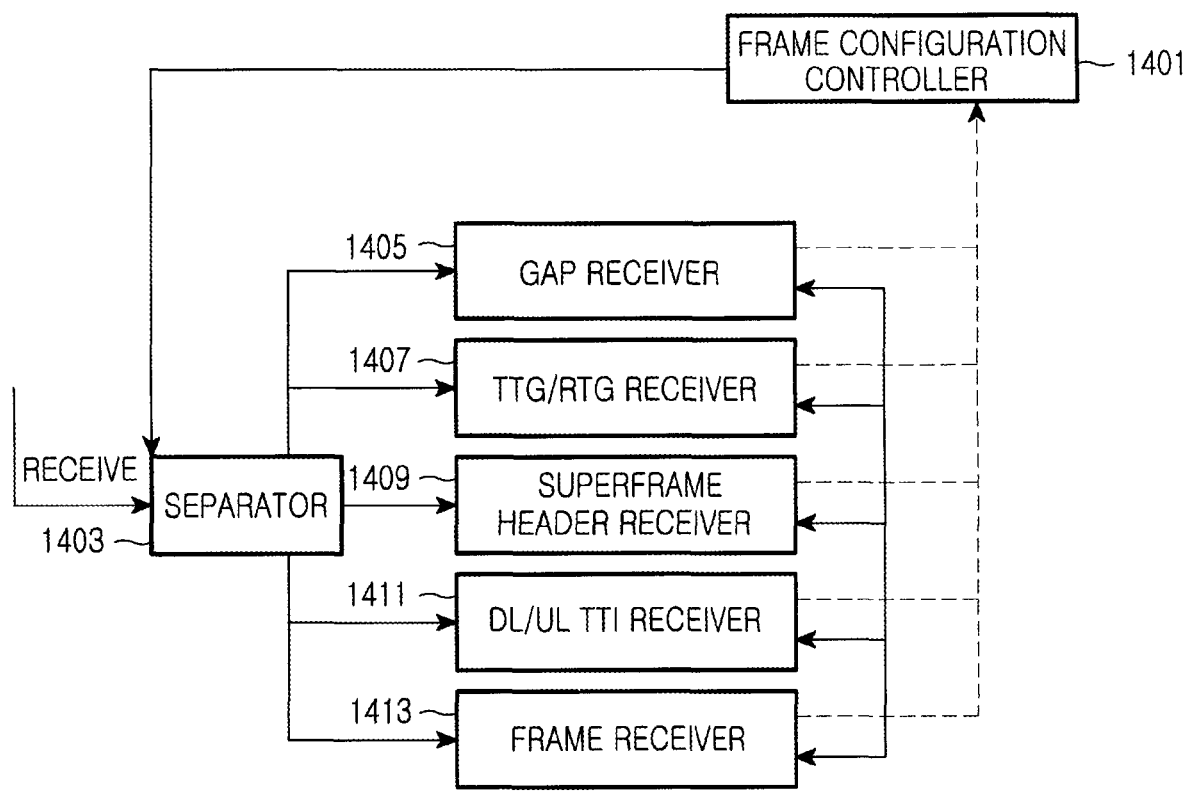
FIG. 12 is a block diagram of a receiver of a MS according to an exemplary embodiment of the present invention.

FIG. 12 is a block diagram of a receiver of an MS according to an exemplary embodiment of the present invention.

Referring to FIG. 12, the MS receiver includes a frame configuration information controller 1401, a separator 1403, a gap receiver 1405, a TTG/RTG receiver 1407, a superframe header receiver 1409, a DL/UL TTI receiver 1411, and a frame receiver for the first communication system 1413.

The frame configuration information controller 1401 stores frame configuration information including $t_{SF\_offset}$, a superframe length, and a DL-UL ratio received from the BS transmitter and controls the separator 1403, the gap receiver 1405, the TTG/RTG receiver 1407, the superframe header receiver 1409, the DL/UL TTI receiver 1411, and the frame receiver for the first communication system 1413 based on the frame configuration information.

If the BS transmitter transmits the frame configuration information on a BCH, in an in-band MAC message during a traffic DL/UL TTI, in a preamble signal of the first communication system, or in a superframe reference signal of the second communication system, the MS receives the frame configuration information through a receiver corresponding to the transmission scheme of the frame configuration information.

The separator 1403 separates frame elements from the received signal under the control of the frame configuration information controller 1401 and outputs them to the gap receiver 1405, the TTG/RTG receiver 1407, the superframe header receiver 1409, the DL/UL TTI receiver 1411, and the frame receiver for the first communication system 1413. The separator 1403 determines whether the frame configuration information has been changed using $t_{SF\_offset}$ received from the frame configuration information controller 1401. If the frame configuration information has been changed, the separator 1403 separates the frame elements according to the changed frame configuration information.

The gap receiver 1405, the TTG/RTG receiver 1407, the superframe header receiver 1409, the DL/UL TTI receiver 1411, and the frame receiver for the first communication system 1413 receive the frame elements under the control of the frame configuration information controller 1401.

In addition, a receiver corresponding to the transmission scheme of the frame configuration information, which is one of transmission on a BCH, transmission in an in-band MAC message during a traffic DL/UL TTI, transmission in a preamble signal of the first communication system, and transmission in a superframe reference signal of the second communication system, receives the frame configuration information from and provides the frame configuration information to the frame configuration information controller 1401.

Figure 13:
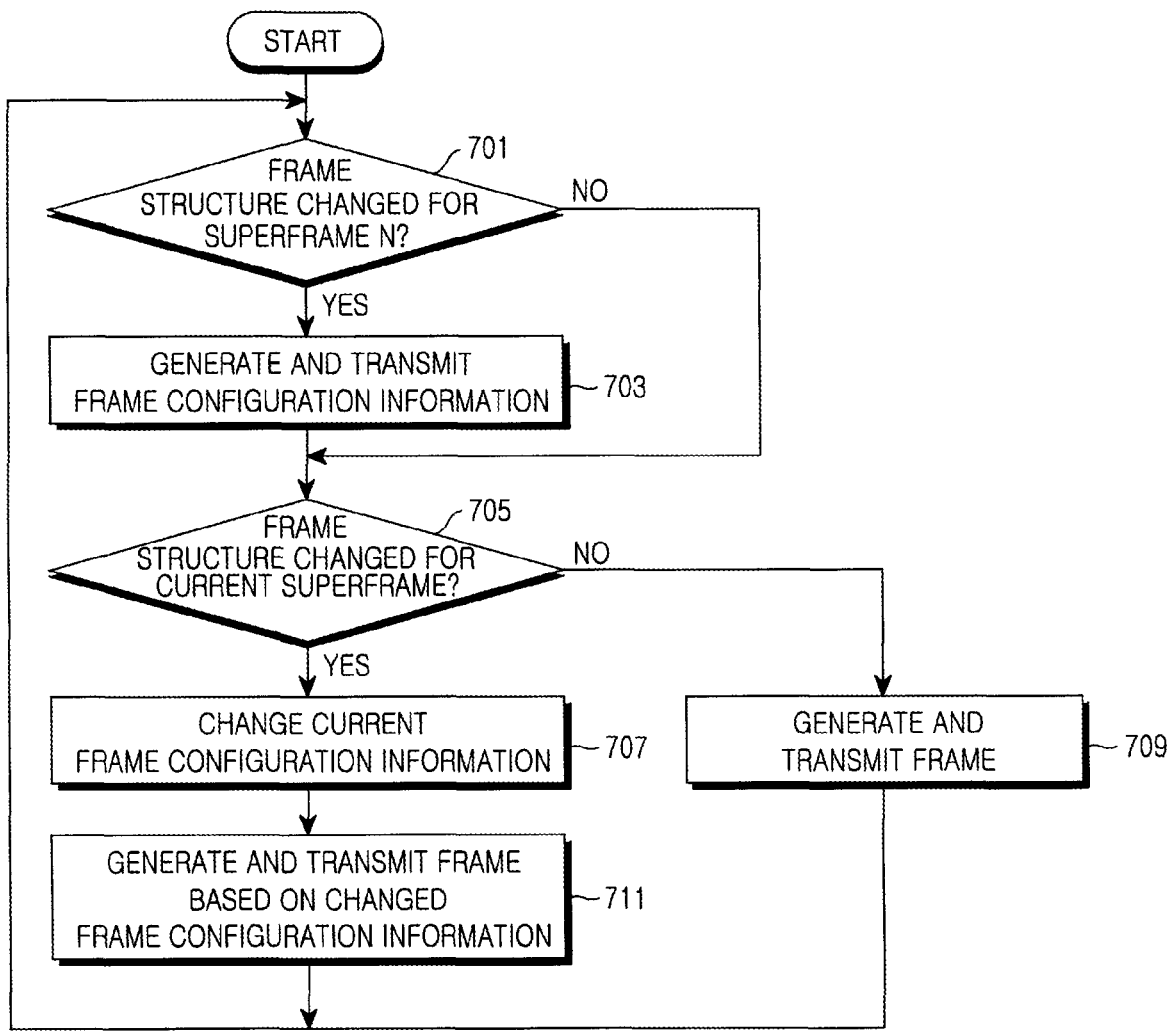
FIG. 13 is a flowchart illustrating an operation for generating and transmitting a frame depending on whether a frame structure has been changed in a BS transmitter according to an exemplary embodiment of the present invention.

FIG. 13 is a flowchart illustrating an operation for generating and transmitting a frame depending on whether a frame structure is changed in the BS transmitter according to an exemplary embodiment of the present invention.

Referring to FIG. 13, the BS determines whether a first frame structure for the first/second communication system is changed in superframe N in step 701. The first frame structure change can be a change in the position(s) of a superframe header, a BCH, or DL/UL TTIs. If the first frame structure is changed, the frame configuration information generator/controller 1301 proceeds to step 703 and otherwise, it jumps to step 705.

In step 703, the frame configuration information generator/controller 1301 generates frame configuration information about the changed common frame structure and transmits it to the MS. To reduce overhead, the frame configuration information generator/controller 1301 transmits the frame configuration information on the BCH, in an in-band MAC message during a traffic DL/UL TTI, in a preamble signal of the first communication system, or in a superframe reference signal of the second communication system.

In step 705, the frame configuration information generator/controller 1301 determines whether the first frame structure is changed in a current superframe. If the first frame structure is changed, the frame configuration information generator/controller 1301 proceeds to step 707 and otherwise, it goes to step 709.

In step 709, the frame configuration information generator/controller 1301 generates a first frame according to current frame configuration information by controlling the gap generator 1303, the TTG/RTG generator 1305, the superframe header generator 1307, the DL/UL TTI generator 1309, and the frame generator 1311 for the first communication system and transmits the first frame to the MS. Then the procedure returns to step 701.

In step 707, the frame configuration information generator/controller 1301 changes the current frame configuration information according to the generated frame configuration information.

In step 711, the frame configuration information generator/controller 1301 generates a first frame based on the changed frame configuration information by controlling the gap generator 1303, the TTG/RTG generator 1305, the superframe header generator 1307, the DL/UL TTI generator 1309, and the frame generator 1311 for the first communication system and transmits the common frame to the MS. Then the procedure returns to step 701.

Figure 14:
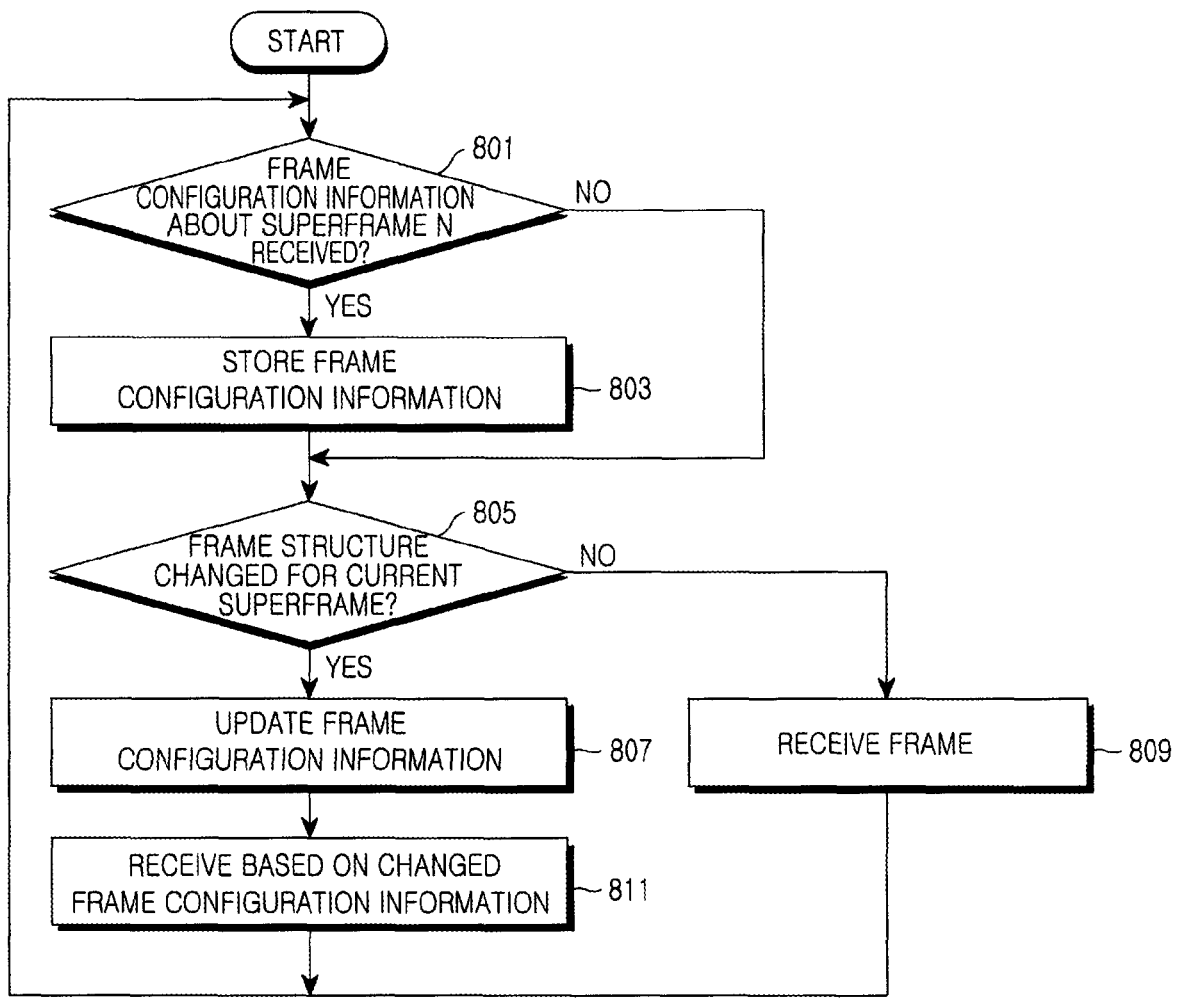
FIG. 14 is a flowchart illustrating an operation for receiving a frame depending on whether a frame structure has been changed according to an exemplary embodiment of the present invention.

FIG. 14 is a flowchart illustrating an operation for receiving a frame depending on whether a frame structure has been changed according to an exemplary embodiment of the present invention.

Referring to FIG. 14, the frame configuration information controller 1401 determines whether frame configuration information about a change in a common frame structure in superframe N has been received in step 801. Upon receipt of the frame configuration information, the frame configuration information controller 1401 proceeds to step 803 and otherwise, it jumps to step 805.

In step 803, the frame configuration information controller 1401 stores the received changed frame configuration information. Then the frame configuration information controller 1401 determines whether a first frame structure is changed in a current superframe. If the first frame structure is changed, the frame configuration information controller 1401 proceeds to step 807 and otherwise, it goes to step 809.

In step 809, the frame configuration information controller 1401 receives a first frame according to current frame configuration information by controlling the gap receiver 1405, the TTG/RTG receiver 1407, the superframe header receiver 1409, the DL/UL TTI receiver 1411, and the frame receiver 1413 for the first communication system and returns to step 801.

In step 807, the frame configuration information controller 1401 changes the current frame configuration information according to the stored changed frame configuration information and goes to step 811.

In step 811, the frame configuration information controller 1401 receives a first frame according to the changed frame configuration information by controlling the gap receiver 1405, the TTG/RTG receiver 1407, the superframe header receiver 1409, the DL/UL TTI receiver 1411, and the frame receiver 1413 for the first communication system.

As is apparent from the above exemplary communication systems, exemplary embodiments of the present invention advantageously allocates resources so that a first communication system can co-exist with a second communication system.

When frame structures for the first and second communication systems are modified, frame configuration information about the changed frame structures is provided. Therefore, a change in a frame structure can be coped with actively.

While the invention has been shown and described with reference to certain exemplary embodiments thereof, they are merely exemplary applications. For example, while it has been described that the first and second communication systems use only TDD frames, they may use Frequency Division Duplexing (FDD) frames. Thus, it will be understood by those skilled in the art that various changes in form and details may be made therein without departing from the spirit and scope of the present invention as defined by the appended claims and their equivalents.

What is claimed is:

1. A method of transmitting a signal by a transmitter in a communication system, in which a first communication system and a second communication system being evolved from the first communication system coexist, using a superframe, the superframe including a first frame area for the first communication system and a second frame area for the second communication system, and the second frame area starting from a superframe header, the method comprising:

determining whether a position of the superframe header in the superframe is to change; and if the position of the superframe header is to change, transmitting to a receiver information indicating that the position of the superframe header is to change, wherein the information includes an indicator indicating that the position of the superframe header is to change, wherein the information is transmitted before the position of the superframe header is changed.

2. The method of claim 1, wherein the superframe header includes at least one of a reference signal and a broadcasting message for the second communication system.

3. The method of claim 1, wherein the information includes at least one of a difference between a superframe duration before the position of the superframe header is changed and a superframe duration after the position of the superframe header is changed, a difference between a number of downlink or uplink Transmission Time Intervals (TTIs) before the position of the superframe header is changed and a number of downlink or uplink TTIs after the position of the superframe header is changed.

4. The method of claim 3, wherein the difference between the superframe duration before the position of the superframe header is changed and the superframe duration after the position of the superframe header is changed, $t_{SF\_offset}$, is calculated by the following equation, $$t_{SF\_offset} = t_{superframe} \cdot T_{DLGAP}$$
$$= t_{superframe} \cdot \Delta N2_{DLTTI} \times t_{DTTI} - T_{DLGAP\_delta}$$

where $t_{superframe}$ denotes the superframe duration before the position of the superframe header is change, $\Delta N2_{DLTTI}$ denotes the difference between the number of downlink TTIs before the position of the superframe header is changed and the number of downlink TTIs after the position of the superframe header is changed, $t_{DTTI}$ denotes a length of a downlink TTI, $T_{DLGAP\_delta} = T_{DLGAP} - \Delta N2_{DLTTI} \times t_{DTTI}$, $T_{DLGAP}$ denotes a time difference between a reference signal or the superframe header before the position of the superframe header is changed and a reference signal or the superframe header after the position of the superframe header is changed.

5. The method of claim 3, wherein the difference between the superframe duration before the position of the superframe header is changed and the superframe duration after the position of the superframe header is changed, $t_{SF\_offset}$, is calculated by the following equation, $$t_{SF\_offset} = t_{superframe} \cdot \Delta N2_{DLTTI} \times t_{DTTI}$$

where $t_{superframe}$ denotes the superframe duration before the position of the superframe header is changed, $\Delta N2_{DLTTI}$ denotes the difference between the number of downlink TTIs before the position of the superframe header is changed and the number of downlink TTIs after the position of the superframe header is changed, and $t_{DTTI}$ denotes the length of a downlink TTI.

6. The method of claim 1, wherein the superframe, after the position of the superframe header is changed, is used for one of the first communication system and the second communication system.

7. The method of claim 1, wherein the position of the superframe header is changed, if at least one of a position of a Broadcast CHannel (BCH) and a position of DownLink/UpLink Transmission Time Intervals (DL/UL TTIs) is changed.

8. The method of claim 1, wherein the transmitting of the information indicating that the position of the superframe header is to change comprises one of transmitting the information on a Broadcast CHannel (BCH), transmitting the information using an in-band Medium Access Control (MAC) message in a traffic DownLink Transmission Time Interval (DL TTI), transmitting the information by overriding a signal corresponding to the information on a preamble of the first communication system, and transmitting the information using a superframe reference signal of the second communication system.

9. A method of receiving a signal by a receiver in a communication system, in which a first communication system and a second communication system being evolved from the first communication system coexist, using a superframe, the superframe including a first frame area for the first communication system and a second frame area for the second communication system, the second frame area starting from a superframe header, the method comprising:
  receiving from a transmitter information indicating that a position of a superframe header in the superframe is to change, if the position of the superframe header is to change; and
  receiving the superframe header at the changed position of the superframe header using the information,
  wherein the information includes an indicator indicating that the position of the superframe header is to change, and
  wherein the information is transmitted before the position of the superframe header is changed.

10. The method of claim 9, wherein the superframe header includes at least one of a reference signal and a broadcasting message for the second communication system.

11. The method of claim 9, wherein the information includes at least one of a difference between a superframe duration before the position of the superframe header is changed and a superframe duration after the position of the superframe header is changed, a difference between a number of downlink or uplink Transmission Time Intervals (TTIs) before the position of the superframe header is changed and a number of downlink or uplink TTIs after the position of the superframe header is changed.

12. The method of claim 11, wherein the difference between the superframe duration before the position of the superframe header is changed and the superframe duration after the position of the superframe header is changed, $t_{SF\_offset}$, is calculated by the following equation, $$t_{SF\_offset} = t_{superframe} \cdot T_{DLGAP}$$
$$= t_{superframe} \cdot \Delta N2_{DLTTI} \times t_{DTTI} - T_{DLGAP\_delta}$$

where $t_{superframe}$ denotes the superframe duration before the position of the superframe header is changed, $\Delta N2_{DLTTI}$ denotes the difference between the number of downlink TTIs before the position of the superframe header is changed and the number of downlink TTIs after the position of the superframe header is changed, $t_{DTTI}$ denotes a length of a downlink TTI, $T_{DLGAP\_delta} = T_{DLGAP} - \Delta N2_{DLTTI} \times t_{DTTI}$, $T_{DLGAP}$ denotes a time difference between a reference signal or the superframe header before the position of the superframe header is changed and a reference signal or the superframe header after the position of the superframe header is changed.

13. The method of claim 11, wherein the difference between the superframe duration before the position of the superframe header is changed and the superframe duration after the position of the superframe header is changed, $t_{SF\_offset}$, is calculated by the following equation, $$t_{SF\_offset} = t_{superframe} \cdot \Delta N2_{DLTTI} \times t_{DTTI}$$

where $t_{superframe}$ denotes the superframe duration before the position of the superframe header is change, $\Delta N2_{DLTTI}$ denotes the difference between the number of downlink TTIs before the position of the superframe header is changed and the number of downlink TTIs after the position of the superframe header is changed, and $t_{DTTI}$ denotes the length of a downlink TTI.

14. The method of claim 9, wherein the superframe, after the position the superframe header is changed, is used for one of the first communication system and the second communication system.

15. The method of claim 9, wherein the position of the superframe header is changed, if at least one of a position of a Broadcast CHannel (BCH) and a position of DownLink/UpLink Transmission Time Intervals (DL/UL TTIs) is changed.

16. The method of claim 9, wherein the receiving of the information indicating that the position of the superframe header is to change comprises receiving one of the information transmitted on a Broadcast CHannel (BCH), the information transmitted using an in-band Medium Access Control (MAC) message in a traffic DownLink Transmission Time Interval (DL TTI), the information transmitted by overriding a signal corresponding to the information on a preamble of the first communication system, and the information transmitted using a superframe reference signal of the second communication system.

17. A communication system, in which a first communication system and a second communication system being evolved from the first communication system coexist, using a superframe, the superframe including a first frame area for the first communication system and a second frame area for the second communication system, the second frame area starting from a superframe header, the system comprising:
  a transmitter; and
  a receiver,
  wherein the transmitter determines whether a position of a superframe header in the superframe is to change, if the position of the superframe header is to change, transmits to the receiver information indicating that the position of the superframe header is to change,
  wherein the information includes an indicator indicating that the position of the superframe header is to change, and
  wherein the information is transmitted before the position of the superframe header is changed.

18. The system of claim 17, wherein the superframe header includes at least one of a reference signal and a broadcasting message for the second communication system.

19. The system of claim 17, wherein the information includes at least one of a difference between a superframe duration before the position of the superframe header is changed and a superframe duration after the position of the superframe header is changed, a difference between a number of downlink or uplink Transmission Time Intervals (TTIs) before the position of the superframe header is changed and a number of downlink or uplink TTIs after the position of the superframe header is changed.

20. The system of claim 19, wherein the difference between the superframe duration before the position of the superframe header is changed and the superframe duration after the position of the superframe header is changed, $t_{SF\_offset}$ is calculated by the following equation, $$t_{SF\_offset} = t_{superframe} \cdot T_{DLGAP}$$
$$= t_{superframe} \cdot \Delta N2_{DLTTI} \times t_{DTTI} - T_{DLGAP\_delta}$$

where $t_{superframe}$ denotes the superframe duration before the position of the superframe header is changed, $\Delta N2_{DLTTI}$ denotes the difference between the number of downlink TTIs before the position of the superframe header is changed and the number of downlink TTIs after the position of the superframe header is changed, $t_{DTTI}$ denotes a length of a downlink TTI, $T_{DLGAP\_delta} = T_{DLGAP} - \Delta N2_{DLTTI} \times t_{DTTI}$, $T_{DLGAP}$ denotes a time difference between a reference signal or the superframe header before the position of the superframe header is changed and a reference signal or the superframe header after the position of the superframe header is changed.

21. The system of claim 19, wherein the difference between the superframe duration before the position of the superframe header is changed and the superframe duration after the position of the superframe header is changed, $t_{SF\_offset}$ is calculated by the following equation, $$t_{SF\_offset} = t_{superframe} \cdot \Delta N2_{DLTTI} \times t_{DTTI}$$

where $t_{superframe}$ denotes the superframe duration before the position of the superframe header is changed, $\Delta N2_{DLTTI}$ denotes the difference between the number of downlink TTIs before the position of the superframe header is changed and the number of downlink TTIs after the position of the superframe header is changed, and $t_{DTTI}$ denotes the length of a downlink TTI.

22. The system of claim 17, wherein the superframe, after the position of the superframe header is used for one of the first communication system and the second communication system.

23. The system of claim 17, wherein the position of the superframe header is changed, if at least one of a position of a Broadcast CHannel (BCH) and DownLink/UpLink Transmission Time Intervals (DL/UL TTIs) is changed.

24. The system of claim 17, wherein the transmitter one of transmits the information on a Broadcast CHannel (BCH), transmits the information using an in-band Medium Access Control (MAC) message in a traffic DownLink Transmission Time Interval (DL TTI), transmits the information by overriding a signal corresponding to the information on a preamble of the first communication system, and transmits the information using a superframe reference signal of the second communication system.

25. A communication system, in which a first communication system and a second communication system being evolved from the first communication system coexist, using a superframe, the superframe including a first frame area for the first communication system and a second frame area for the second communication system, the second frame area starting from a superframe header, the system comprising:

a transmitter; and a receiver, wherein the receiver receives from a transmitter information indicating that a position of a superframe header in the superframe is to changed, if the position of the superframe header is to change, and receives the superframe header at the changed position of the superframe header using the information, wherein the information includes an indicator indicating that the position of the superframe header is to change, and wherein the information is transmitted before the position of the superframe header is changed.

26. The system of claim 25, wherein the superframe header includes at least one of a reference signal and a broadcasting message for the second communication system.

27. The system of claim 25, wherein the information includes at least one of a difference between a superframe duration before the position of the superframe header is changed and a superframe duration after the position of the superframe header is changed, a difference between a number of downlink or uplink Transmission Time Intervals (TTIs) before the position of the superframe header is changed and a number of downlink or uplink TTIs after the position of the superframe header is changed.

28. The system of claim 27, wherein the difference between the superframe duration before the position of the superframe header is changed and the superframe duration after the position of the superframe header is changed, $t_{SF\_offset}$ is calculated by the following equation, $$t_{SF\_offset} = t_{superframe} \cdot T_{DLGAP} = t_{superframe} \cdot \Delta N2_{DLTTI} \times t_{DTTI} - T_{DLGAP\_delta}$$

where $t_{superframe}$ denotes the superframe duration before the position of the superframe header is changed, $\Delta N2_{DLTTI}$ denotes the difference between the number of downlink TTIs before the position of the superframe header is changed and the number of downlink TTIs after the position of the superframe header is changed, $t_{DTTI}$ denotes a length of a downlink TTI, $T_{DLGAP\_delta} = T_{DLGAP} - \Delta N2_{DLTTI} \times t_{DTTI}$, $T_{DLGAP}$ denotes a time difference between a reference signal or the superframe header before the position of the superframe header is changed and a reference signal or the superframe header after the position of the superframe header is changed.

29. The system of claim 27, wherein the difference between the superframe duration before the position of the superframe header is changed and the superframe duration after the position of the superframe header is changed, $t_{SF\_offset}$ is calculated by the following equation, $$t_{SF\_offset} = t_{superframe} \cdot N2_{DLTTI} \times t_{DTTI}$$

where $t_{superframe}$ denotes the superframe duration before the position of the superframe header is changed, $\Delta N2_{DLTTI}$ denotes the difference between the number of downlink TTIs before the position of the superframe header is changed and the number of downlink TTIs after the position of the superframe header is changed, and $t_{DTTI}$ denotes the length of a downlink TTI.

30. The system of claim 25, wherein the superframe, after the position of the superframe header is changed, is used for one of the first communication system and the second communication system.

31. The system of claim 25, wherein the position of the superframe is changed, if at least one of a position of a Broadcast CHannel (BCH) and a position of DownLink/UpLink Transmission Time Intervals (DL/UL TTIs) is changed.

32. The system of claim 25, wherein the receiver receives one of the information transmitted on a Broadcast CHannel (BCH), the information transmitted using an in-band Medium Access Control (MAC) message in a traffic DownLink Transmission Time Interval (DL TTI), the information transmitted by overriding a signal corresponding to the information on a preamble of the first communication system, and the information transmitted using a superframe reference signal of the second communication system.

* * * * *